United States Patent
Ishihara

(10) Patent No.: US 11,001,240 B2
(45) Date of Patent: May 11, 2021

(54) ANTI LOCKING BRAKE MODULE INTERNAL ARRANGEMENT FOR MOTORCYCLE

(71) Applicant: Suzuki Motor Corporation, Hamamatsu (JP)

(72) Inventor: Masao Ishihara, Hamamatsu (JP)

(73) Assignee: Suzuki Motor Corporation

( * ) Notice: Subject to any disclaimer, the term of this patent is extended or adjusted under 35 U.S.C. 154(b) by 242 days.

(21) Appl. No.: 16/193,827

(22) Filed: Nov. 16, 2018

(65) Prior Publication Data

US 2019/0152452 A1 May 23, 2019

(30) Foreign Application Priority Data

Nov. 17, 2017 (JP) .............................. JP2017-221794

(51) Int. Cl.
*B60T 8/17* (2006.01)
*B60T 8/36* (2006.01)
(Continued)

(52) U.S. Cl.
CPC .......... *B60T 8/1706* (2013.01); *B60T 8/3685* (2013.01); *B62J 37/00* (2013.01); *B62K 11/04* (2013.01); *B62L 1/00* (2013.01); *B62M 7/02* (2013.01); *B60K 11/04* (2013.01); *B60K 13/04* (2013.01); *B60T 2270/10* (2013.01)

(58) Field of Classification Search
CPC ... B60T 2270/10; B60T 8/1706; B60T 8/3685
See application file for complete search history.

(56) References Cited

U.S. PATENT DOCUMENTS

2007/0145227 A1* 6/2007 Hasegawa .............. B62K 11/04
248/637
2010/0101886 A1* 4/2010 Ishibe .................. B62K 25/283
180/296
(Continued)

FOREIGN PATENT DOCUMENTS

EP           3239008 A1    11/2017
JP       2012-210849 A     11/2012
JP        2012210849 A     11/2012

OTHER PUBLICATIONS

Machine Translation JP2012210849A "Motorcycle"—Specification English Translation Nov. 1, 2012 (Year: 2012).*

*Primary Examiner* — Ruth Ilan
*Assistant Examiner* — Myles A Harris
(74) *Attorney, Agent, or Firm* — Barnes & Thornburg LLP

(57) ABSTRACT

A motorcycle includes a front frame configured by connecting a head pipe, frame, down frame, and lower frame in a loop shape. The motorcycle also includes a rear frame, an engine disposed inside the front frame, an air cleaner disposed inside the rear frame, a suction pipe and fuel supply device connected to the air cleaner and supply gas to the engine, an ABS module controlling locking of wheels at the time of braking, and a cross member bridged between the right and left main frames at the rear portion of the front frame. The suction pipe and the fuel supply device are provided to pass on the upper side of the cross member; the ABS module is disposed below the suction pipe and the fuel supply device is disposed behind a cylinder assembly of the engine and above the rear portion of the crankcase.

5 Claims, 5 Drawing Sheets

(51) Int. Cl.
*B62K 11/04* (2006.01)
*B62J 37/00* (2006.01)
*B62L 1/00* (2006.01)
*B62M 7/02* (2006.01)
B60K 11/04 (2006.01)
B60K 13/04 (2006.01)

(56) References Cited

U.S. PATENT DOCUMENTS

| | | | |
|---|---|---|---|
| 2015/0122571 A1* | 5/2015 | Murayama | B60K 13/04 |
| | | | 180/227 |
| 2017/0008600 A1* | 1/2017 | Kitagawa | B60T 8/3685 |
| 2019/0202521 A1* | 7/2019 | Yamamoto | B62L 3/00 |
| 2020/0140031 A1* | 5/2020 | Ishii | B62K 19/38 |
| 2020/0164944 A1* | 5/2020 | Yamasaki | B62H 1/00 |

* cited by examiner

ANTI LOCKING BRAKE MODULE INTERNAL ARRANGEMENT FOR MOTORCYCLE

CROSS-REFERENCE TO RELATED APPLICATION

This application claims the benefit of priority of Japanese Patent Application No. 2017-221794, filed on Nov. 17, 2017, the entire contents of which are incorporated herein by reference.

BACKGROUND OF THE INVENTION

Field of the Invention

Embodiments of the present invention relate to a technique for arranging an ABS module in a motorcycle.

Description of the Related Art

Conventionally, there have been disclosed a motorcycle which is equipped with an ABS module disposed in front of an engine at the bottom of a down frame and is capable of off-road running (e.g., Japanese Unexamined Patent Application Publication No. 2012-210849).

However, the above-described conventional technique has the following problems.

Firstly, there is a possibility that mud and stones bounced up by the front wheel may come to the ABS module disposed at the front lower portion of the vehicle body and the ABS module is damaged by a collision with the road surface at the time of overturning of the vehicle body.

Secondly, in the structure in which the ABS module is disposed below the radiator of the water-cooled engine, it is necessary to reduce the volume of the radiator, which degrades the cooling performance.

SUMMARY OF THE INVENTION

In view of the above-described problems, an object of the present invention is to provide the motorcycle which has a compact and slim body without reducing the volume of its fuel tank, air cleaner and radiator, and an ABS module protected from shock.

A motorcycle according to the present embodiment includes: a front frame configured by connecting a head pipe provided at the front portion of its vehicle body, a pair of right and left main frames, a down frame, and a pair of right and left lower frames in a loop shape; a rear frame equipped with a seat rail stay and a seat rail that are connected to the rear portion of the front frame and supports a seat at its upper portion; an engine disposed inside a region surrounded by the front frame; an air cleaner disposed inside a region surrounded by the rear frame; a suction pipe and a fuel supply device that are connected to the air cleaner and supply mixture gas for combustion to the engine; an ABS module configured to control locking of the wheels at the time of braking; and a cross member bridged between the right and left main frames at the rear portion of the front frame, wherein the suction pipe and the fuel supply device are provided so as to pass on the upper side of the cross member; and the ABS module is disposed below the suction pipe and the fuel supply device, behind a cylinder assembly of the engine, and above the rear portion of the crankcase.

According to the present invention, it is possible to provide the motorcycle which has a compact and slim body without reducing the volume of its fuel tank, air cleaner and radiator, and an ABS module protected from shock.

DETAILED DESCRIPTION

Hereinbelow, embodiments of the present invention will be described by referring to the accompanying drawings.

Figure 1:
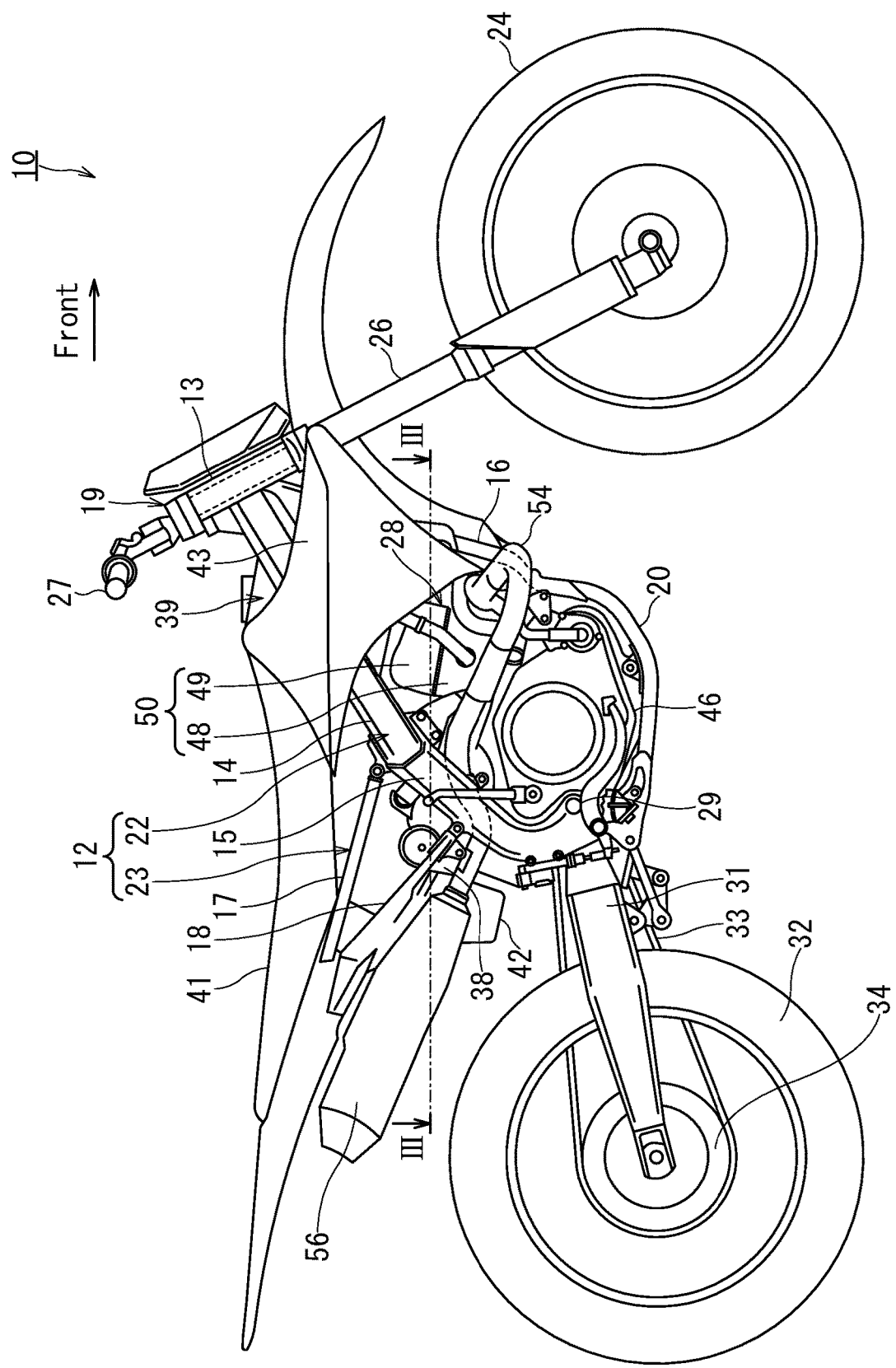
FIG. 1 is a right side view illustrating a motorcycle to which one embodiment of the present invention is applied.
Figure 2:
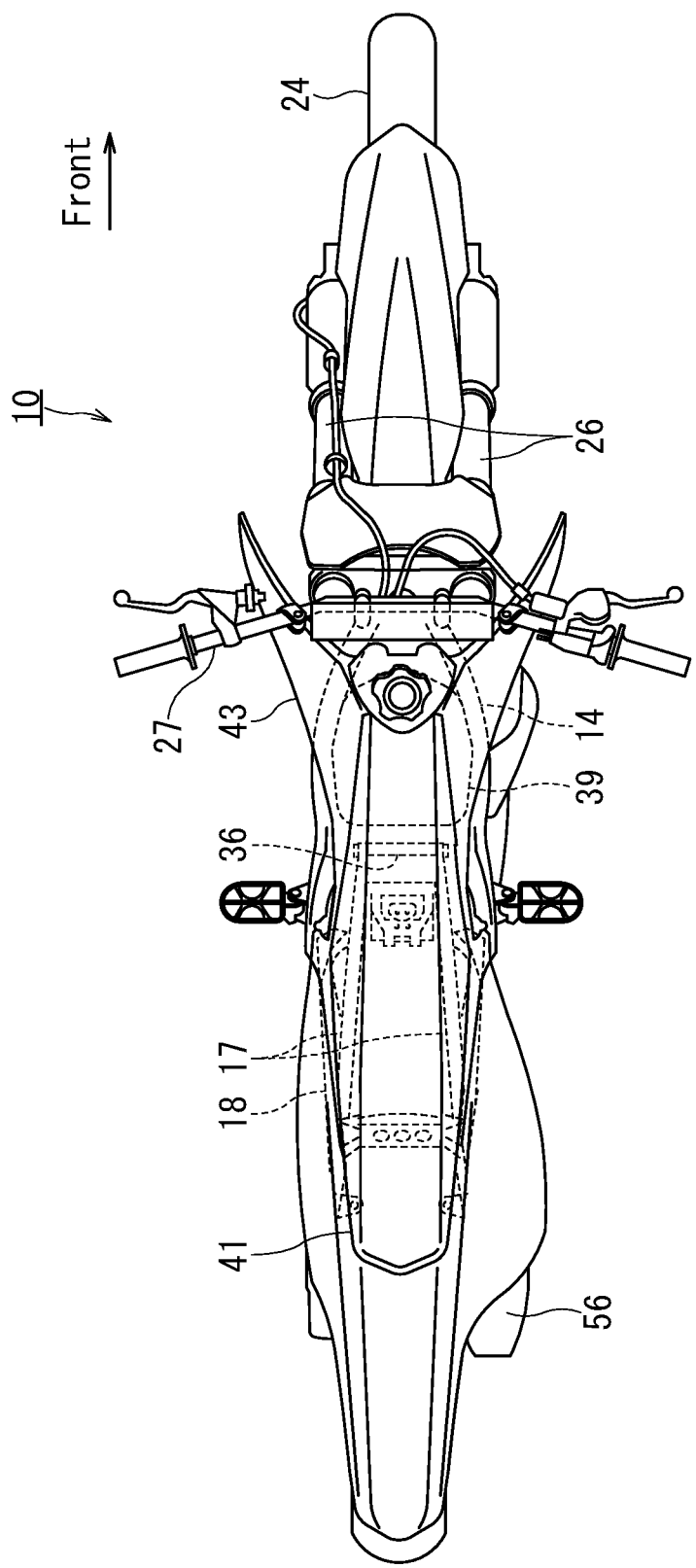
FIG. 2 is a plan view of the motorcycle.

FIG. 1 is a right side view illustrating an off-road type motorcycle 10 to which an embodiment of the present invention is applied, and FIG. 2 is a plan view of the motorcycle 10.

Figure 3:
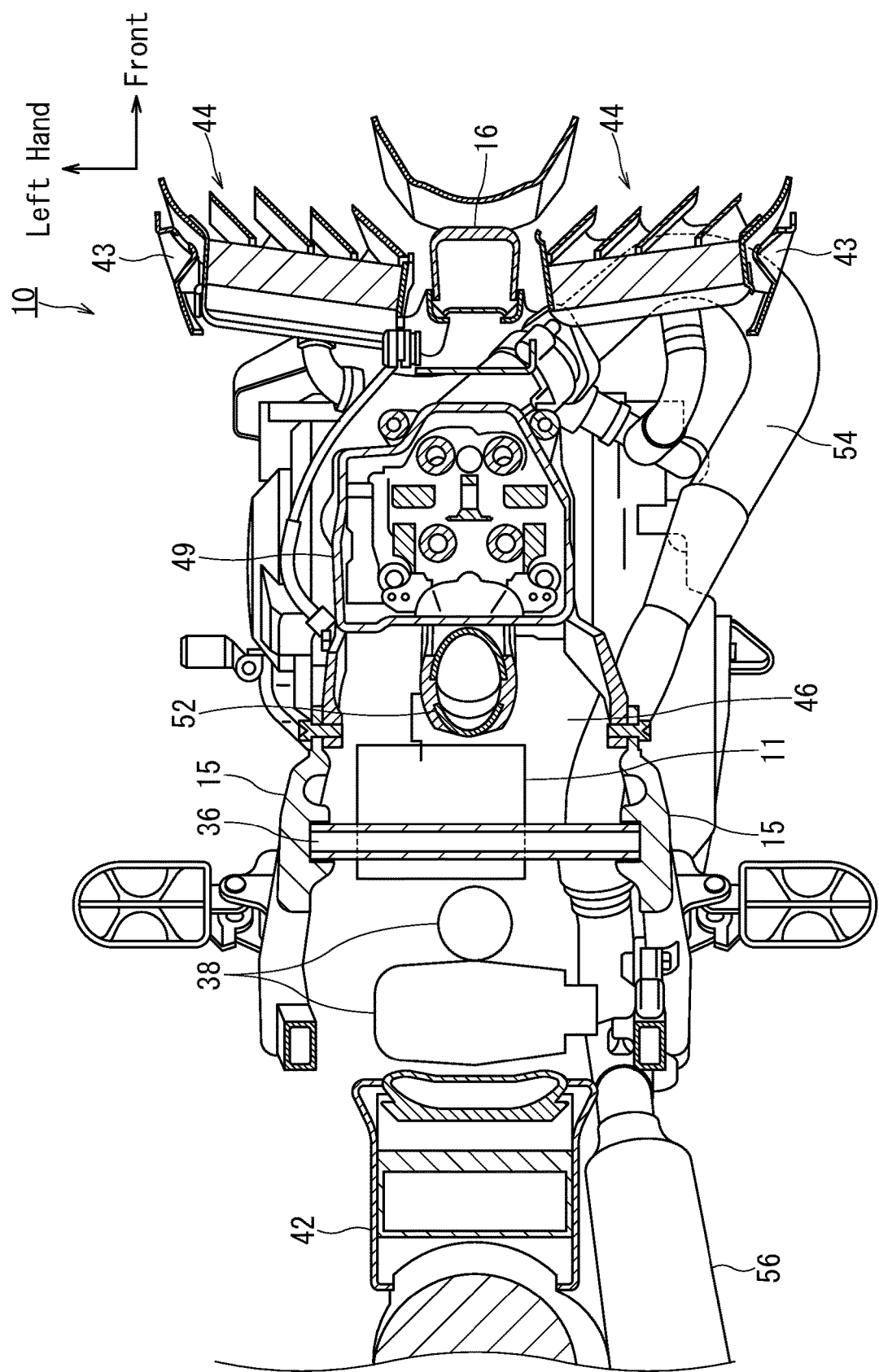
FIG. 3 is a cross-sectional view taken along the line of FIG. 1.

FIG. 3 is a cross-sectional view taken along the line III-III of FIG. 1.

Figure 4:
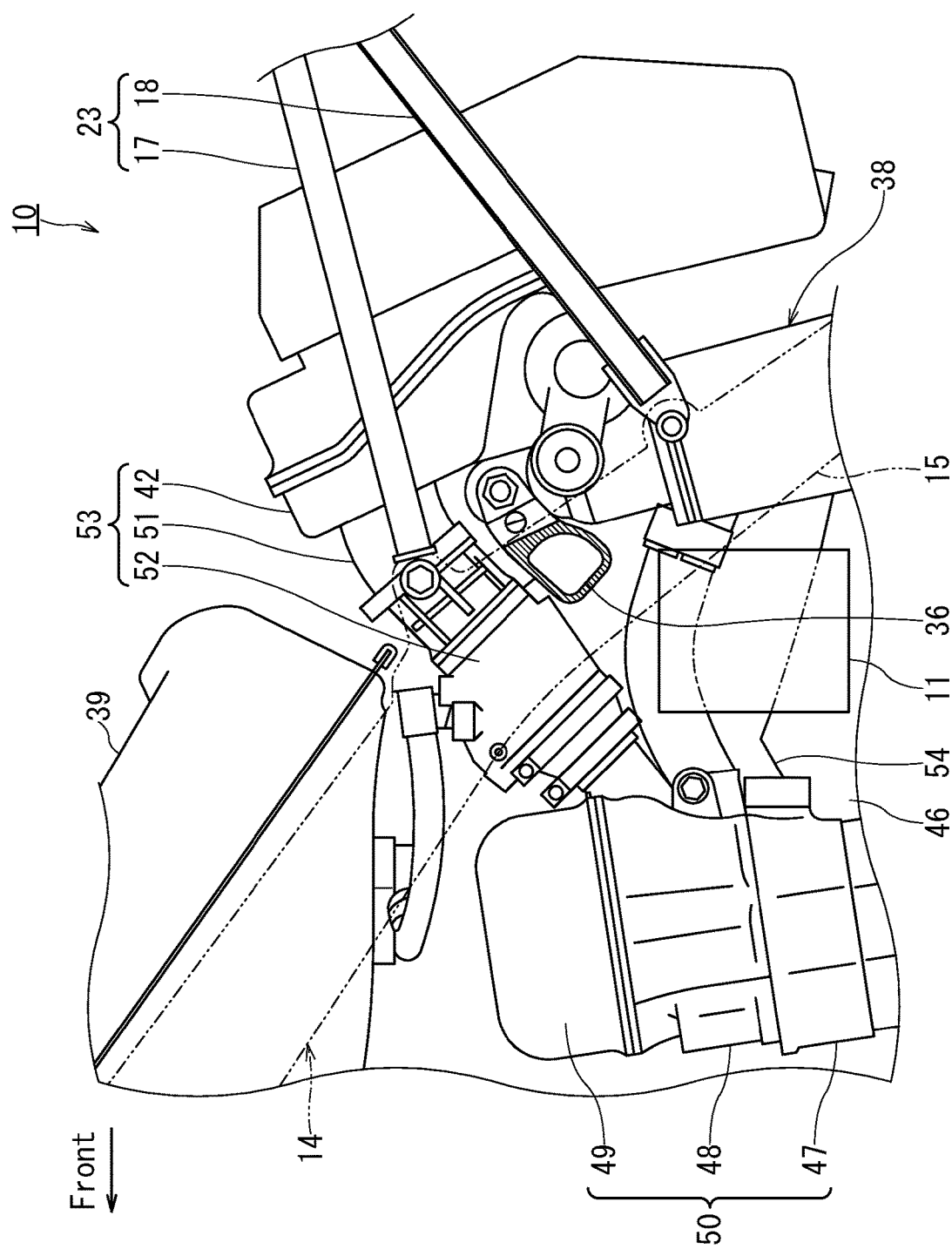
FIG. 4 is a partial left side view of the periphery of the ABS module of the motorcycle.
Figure 5:
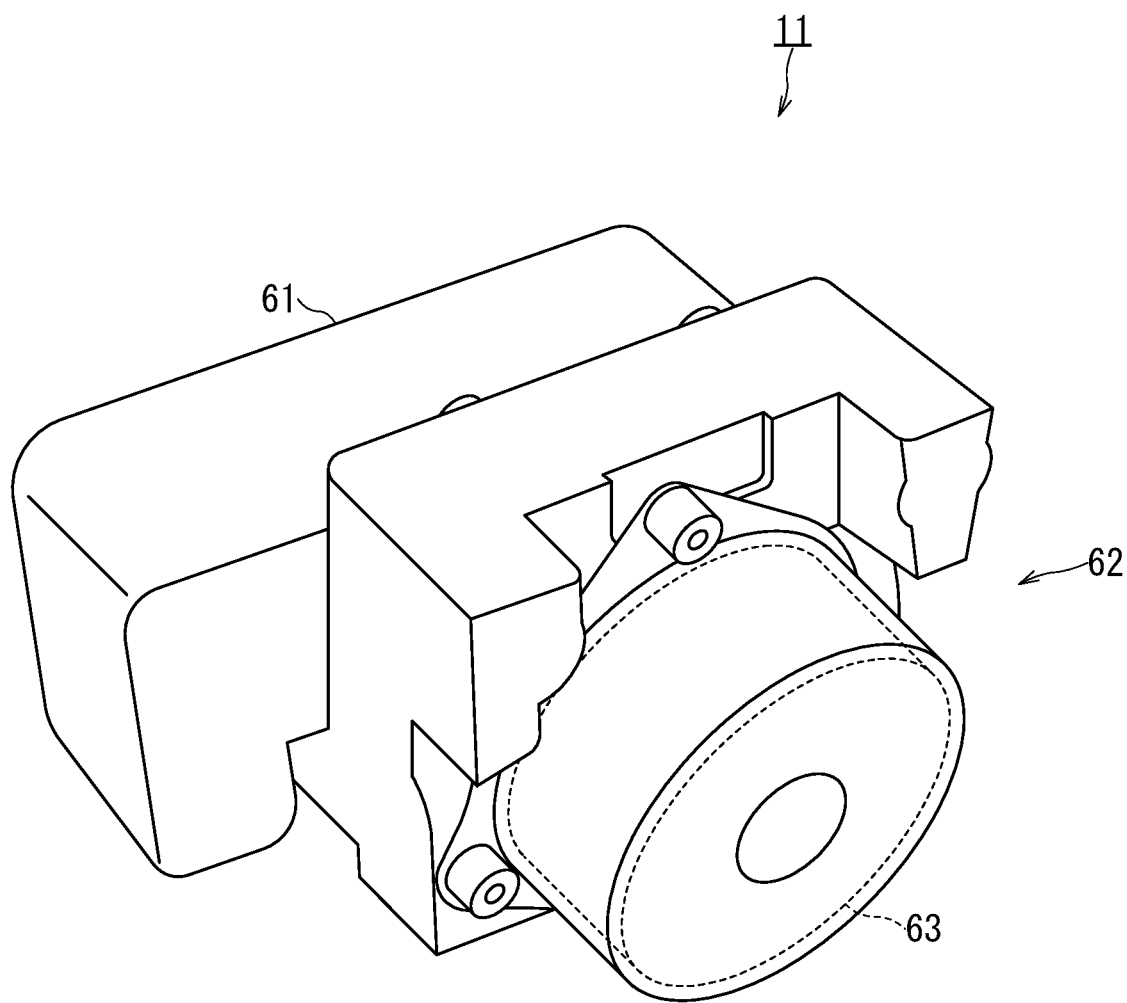
FIG. 5 is a perspective view of the ABS module provided in the motorcycle.

FIG. 4 is a partial left side view of the periphery of the ABS module 11 of the motorcycle 10, and FIG. 5 is a perspective view of the ABS module 11 provided in the motorcycle 10.

In each Figure, directional terms such as upper, upward, lower, downward, right, left, front, and rear are represented in the viewpoint of a rider who rides on the motorcycle 10.

As shown in FIG. 1 to FIG. 4, the motorcycle 10 according to the present embodiment is, e.g., an off-road type motorcycle such as a motocrosser. The vehicle-body frame 12 constituting the framework of the motorcycle 10 is mainly composed of a head pipe 13, a pair of right and left main frames 14, a pair of right and left center frames (i.e., body frames) 15, a down frame 16, a pair of right and left seat rails 17, and a pair of right and left seat rail stays 18, and a pair of right and left lower frames 20.

In the body frame 12, a front frame 22 is constituted by the head pipe 13, the pair of right and left main frames 14, the pair of right and left center frames 15, the down frame 16, and the pair of right and left lower frames 20.

Further, a rear frame 23 is constituted by the pair of right and left seat rails 17 and the pair of right and left seat rail stays 18.

The head pipe 13 is disposed at the front head of the vehicle body and is provided with a handlebar 27 and a front fork 26 for rotatably supporting the front wheel 24. In addition, the pair of right and left main frames 14 are connected to the head pipe 13, and the head pipe 13 is inclined backward and downward so as to extend rearward. At the rear portion of the main frames 14, the center frames 15 extend downward to surround the rear of the engine 28.

On the lower portion of the head pipe 13, one down frame 16 extends downward on the front side of the engine 28. The lower end of this down frame 16 is connected to the respective front ends of the pair of right and left lower frames 20 on the front side of the engine 28.

The pair of right and left lower frames 20 are curved at the front lower portion of the engine 28 and extend substantially horizontally to the rear.

The respective rear ends of the pair of right and left lower frames 20 are connected to the respective lower ends of the center frames 15 such that the front frame 22 is configured in a loop shape. By configuring the front frame 22 in this manner, the engine 28 is disposed inside the closed area surrounded by the front frame 22.

A swing arm 31 is pivotally supported so as to be vertically swingable with respect to a pivot shaft 29 mounted on a pair of brackets that are provided on the respective lower portions of the right and left center frames 15 to face each other. The swing arm 31 extends rearward from the pivot shaft at its front end, and the rear wheel 32 is supported at the rear end of the swing arm. The power of the engine 28 is transmitted from a non-illustrated drive sprocket to the rear wheel 32 via a drive chain 33 and a driven sprocket 34.

Further, a cross member 36 is bridged over the respective upper portions of the right and left center frames 15, whereby the vehicle body frame 12 is reinforced. The upper end portion of a cushion unit 38 of the rear suspension is attached to the cross member 36. The lower end of the cushion unit 38 is connected to the swing arm 31.

In the rear frame 23, the respective front end portions of the pair of right and left seat rails 17 are connected to the respective top portions of the center frames 15 or the respective rear end portions of the main frames 14. The seat rails 17 is provided to extend rearward and upward toward the rear of the vehicle body. The respective rear end portions of the pair of right and left seat rail stays 18 are connected to the respective rear end portions of the seat rails 17. By connecting the respective front ends of the seat rail stays 18 to the middle of the center frames 15, the seat rails 17 are reinforced.

A fuel tank 39 is installed above the engine 28 mounted on the front frame 22 so as to be sandwiched between the right and left main frames 14. A seat 41 is provided directly behind the fuel tank 39. The seat 41 extends rearward and is mounted on the right and left seat rails 17. The fuel tank 39 is covered with a pair of right and left radiator covers 43 that are mounted on the down frame 16 and extend to the front end portion of the seat 41.

An air cleaner 42 is disposed in a space surrounded by the right and left seat rails 17 and the right and left seat rail stays 18.

A radiator 44 is mounted along the down frame 16, and both right and left outer sides of the radiator 44 are covered with the radiator covers 43.

The engine 28 is, e.g., a four-cycle single cylinder engine, includes a crankcase 46 configured to house a non-illustrated crank mechanism and a non-illustrated mission mechanism, and further includes a cylinder (i.e., cylinder block) 47 standing on the front portion of the crankcase 46.

A cylinder head 48 is provided at the head top portion of the cylinder 47 and a head cover 49 is provided at the head top portion of the cylinder head 48 to constitute the cylinder assembly 50 as a whole.

The air cleaner 42 forms an engine intake system 53 for supplying a mixture of fuel and air into the cylinder bore of the engine 28 together with a suction pipe 51 and a fuel supply device 52. The air cleaner 42 is connected to the fuel supply device 52 provided in a non-illustrated intake port on the cylinder head 48 from the rear side of the vehicle body via the suction pipe 51. The fuel supply device 52 may be constituted by a throttle body and a fuel injector.

In addition, an exhaust pipe 54 is connected to an exhaust port provided at the front portion of the cylinder head 48. The exhaust pipe 54 extends from the front portion of the cylinder head 48 to the right front of the cylinder assembly 50.

After bent to the right rearward at the side of the down frame 16, the exhaust pipe 54 extends rearward inside the right and left center frames 15 and above the crankcase 46 from the outside of the cylinder assembly 50 which is one side of the engine 28, and is connected to an exhaust muffler 56 disposed at the rear portion of the vehicle body. The engine exhaust is exhausted from the exhaust muffler 56.

In the above-described motorcycle 10, as shown in FIG. 4, the suction pipe 51 and the fuel supply device 52 are provided so as to go round the cross member 36 upward. That is, the suction pipe 51 and the fuel supply device 52 are disposed at the upper portion of the vehicle body frame 12.

The ABS module 11 is disposed in the space which is behind the cylinder assembly 50 and is formed between the crankcase 46 and the entirety of the suction pipe 51 and the fuel supply device 52.

Further, in relation to the exhaust pipe 54, the ABS module 11 overlaps the exhaust pipe 54, which extends rearward on the vehicle-body right side, in the vertical direction. That is, the ABS module 11 and the exhaust pipe 54 overlap each other in a vehicle side view.

Inside the crankcase 46, a transmission having a speed change gear is disposed at the vehicle-body left side and a starting clutch being larger in diameter than the speed change gear of the transmission is disposed at the vehicle-body right side.

Accordingly, the upper surface of the crankcase 46 is formed such that the vehicle-body left side where the ABS module 11 is disposed is lower in height than the vehicle-body right side where the starting clutch is disposed.

As the result of such arrangement, a space in which the ABS module 11 can be disposed is formed above the rear portion of the crankcase 46, and thus the vehicle body becomes slim and compact without reducing the volume of the fuel tank 39 or the air cleaner 42.

As shown in FIG. 5, for instance, the ABS module 11 is configured by integrating an ECU (Electronic Control Unit) 61 and a HU (Hydraulic Control Unit or Hydro Unit) 62 that is an actuator.

Inside the ECU 61, a non-illustrated electronic board is provided to process the information on brake control variables such as front and rear wheel speed, vehicle body speed, and valve opening/closing time.

The HU 62 is equipped with a hydraulic system for the rear wheel and the front wheel, and the hydraulic system is formed by a valve unit, a motor 63, a pump, and a reservoir that are included in the HU 62. Under the control of the ECU 61, the HU 62 intermittently raises and lowers the hydraulic pressure of the brake fluid so as to control the braking force to the wheels.

In the motorcycle 10 according to the present embodiment, the ABS module 11 is disposed so as to be biased toward the vehicle-body left side, which is opposite to the vehicle-body right side equipped with the exhaust pipe 54. In addition, the ABS module 11 is mounted in such a manner that the ECU 61 and the exhaust pipe 54 are disposed so as to be positionally opposed to each other (i.e., face each other) with respect to the HU 62. In other words, the ABS module 11 is disposed such that the motor 63 of the HU 62 faces the side of the exhaust pipe 54 and overlaps the exhaust pipe 54 in a vehicle side view. The ABS module 11 is disposed so as to be biased to the vehicle-body left side and the exhaust pipe 54 is disposed so as to be biased to the vehicle-body right side, and thus an adiabatic gap can be secured between the ABS module 11 and the exhaust pipe 54.

Further, the ECU 61 including the electronic board is disposed so as to be positioned at the opposite side of the exhaust pipe 54 with respect to the HU 62, and thus it is possible to prevent the electronic board from being heated to a high temperature due to radiant heat from the exhaust pipe 54 and heated air of a high temperature. Similarly, a plate-shaped heat shielding member (not shown) may be provided between the ABS module 11 and the exhaust pipe 54 or the crankcase 46 in order to prevent heat input to the electronic board.

The ABS module 11 may be fixed to a non-instructed support boss provided on the upper surface of the crankcase 46 by using, e.g., bolts.

Additionally, in the motorcycle 10, the cylinder assembly 50 is installed upright on the front portion of the crankcase 46 so as to be substantially vertical. The radiator 44 arranged along the down frame 16 on the front side of the cylinder assembly 50 is installed so as to be divided on the right and left sides of the down frame 16.

By standing the cylinder assembly 50 upright on the front portion of the crankcase 46, the forward protrusion of the cylinder assembly 50 is alleviated. In other words, a sufficient space for disposing the ABS module 11 can be secured in the rear portion of the cylinder assembly 50 while the cylinder assembly 50 is prevented from interfering with the installation of the radiator 44.

In the motorcycle 10 according to the present embodiment as described above, by having the suction pipe 51 and the fuel supply device 52 to detour, a space capable of disposing the ABS module 11 is formed above the rear portion of the crankcase 46 without decreasing the volume of the fuel tank 39 and the air cleaner 42.

In the motorcycle 10 according to the present embodiment, the vehicle body can be made slim and compact without reducing the volume of the fuel tank 39 or the air cleaner 42.

In such a configuration, since the ABS module 11 is disposed inside the region surrounded by the front frame 22, the ABS module 11 is protected by the front frame 22 at the time of overturning of the vehicle body and damage due to a collision with the road surface can be prevented.

While certain embodiments have been described, these embodiments have been presented by way of example only, and are not intended to limit the scope of the inventions.

The above-described embodiments may be embodied in various forms; furthermore, various omissions, substitutions, changes, and combinations of the above-described embodiments may be made without departing from the spirit of the inventions.

The accompanying claims and their equivalents are intended to cover such forms or modifications as would fall within the scope and spirit of the inventions.

What is claimed is:

1. A motorcycle comprising:
    a front frame configured by connecting a head pipe provided at a front portion of a vehicle body, a pair of right and left main frames, a down frame, and a pair of right and left lower frames in a loop shape;
    a rear frame equipped with a seat rail and a seat rail stay, the seat rail connected to a rear portion of the front frame and supporting a seat at an upper portion of the seat rail;
    an engine disposed inside a region surrounded by the front frame;
    an air cleaner disposed inside a region surrounded by the rear frame;
    a suction pipe and a fuel supply device that are connected to the air cleaner and supply mixture gas for combustion to the engine;
    an ABS module configured to control locking of wheels at a time of braking; and
    a cross member bridged between the right and left main frames and integrally molded at the rear portion of the front frame,
    wherein the cross member is disposed behind the cylinder assembly of the engine,
    wherein the air cleaner is disposed behind the cross member,
    wherein the suction pipe and the fuel supply device are provided in such a manner that the suction pipe and the fuel supply device detour on an upper side of the cross member; and
    the ABS module is disposed below the suction pipe and the fuel supply device, behind a cylinder assembly of the engine, in front of the air cleaner, below the cross member and above a rear portion of the crankcase.

2. The motorcycle according to claim 1, further comprising an exhaust pipe for exhausting exhaust gas from the engine to an exhaust muffler,
    wherein the exhaust pipe is configured to
        extend from a cylinder-head front portion of the cylinder assembly to a right front of the cylinder assembly,
        then be bent to right rearward at a side of the down frame,
        then extend rearward at a right side of a vehicle body which is one side of the engine, and
        then be connected to the exhaust muffler; and
    the ABS module is configured to overlap with the exhaust pipe extending rearward on a right side of the vehicle body in a vehicle side view and is disposed to be biased toward a vehicle-body left side which is opposite to a side of the exhaust pipe.

3. The motorcycle according to claim 2,
    wherein the ABS module includes;
        an electronic control unit that includes a built-in electronic board and processes information on brake control by the ABS module; and
        a hydraulic control unit that includes a built-in motor and performs the brake control by controlling hydraulic pressure of brake fluid based on the information, and
    wherein the electronic board and the exhaust pipe are disposed in such a manner that the electronic board and the exhaust pipe are opposed to each other with respect to the motor.

4. The motorcycle according to claim 1, further comprising a radiator,
    wherein the engine is provided at a front portion of the crankcase with a cylinder in an upright state; and
    the radiator is arranged along the down frame on right and left sides of the down frame on a front side of the cylinder.

5. The motorcycle according to claim 1, wherein the ABS module is configured to overlap with the cross member in a vehicle top view.

* * * * *